(12) United States Patent
Zhu

(10) Patent No.: US 12,466,172 B1
(45) Date of Patent: Nov. 11, 2025

(54) FILM STICKING DEVICE

(71) Applicant: Hongling Zhu, Sichuan Province (CN)

(72) Inventor: Hongling Zhu, Sichuan Province (CN)

( * ) Notice: Subject to any disclaimer, the term of this patent is extended or adjusted under 35 U.S.C. 154(b) by 0 days.

(21) Appl. No.: 19/089,204

(22) Filed: Mar. 25, 2025

(30) Foreign Application Priority Data

Mar. 14, 2025 (CN) .......................... 202520450300.3

(51) Int. Cl.
B32B 41/00 (2006.01)
B32B 37/00 (2006.01)

(52) U.S. Cl.
CPC .... B32B 37/0046 (2013.01); B32B 2457/208 (2013.01)

(58) Field of Classification Search
CPC ...................... B32B 37/0046; B32B 2457/208
USPC .................... 156/60, 64, 350, 351, 378, 379
See application file for complete search history.

(56) References Cited

U.S. PATENT DOCUMENTS

2019/0047815 A1* 2/2019 Kim .......................... C09J 7/00

* cited by examiner

Primary Examiner — Michael N Orlando
Assistant Examiner — Joshel Rivera

(57) ABSTRACT

A film sticking device includes a main body. The main body includes a first film sticking part. The first film sticking part is provided with a first bottom wall and a first side wall. The first bottom wall is connected to the first side wall. A first accommodating slot is surrounded and formed between the first bottom wall and the first side wall. The first accommodating slot is used for receiving an electronic device. A first accommodating opening is defined in the first accommodating slot. The first accommodating opening is in communication with the first accommodating slot. The first bottom wall is provided with a protruding film positioning component. The film positioning component is used for fixing the screen protection film.

19 Claims, 13 Drawing Sheets

FILM STICKING DEVICE

CROSS-REFERENCE TO RELATED APPLICATIONS

The application claims priority of Chinese patent application CN2025204503003, filed on Mar. 14, 2025, which is incorporated herein by reference in its entireties.

TECHNICAL FIELD

The present invention relates to the field of film sticking, particularly to a film sticking device.

BACKGROUND ART

At present, in order to protect the screens of electronic devices such as mobile phones, it is often necessary to stick films to the screens. However, currently on the market, the films usually need to be stuck manually. It is very difficult to accurately and aesthetically adhere the protection films to the screens, resulting in bubbles and dust between the protection films and the screens. Moreover, the protection films are prone to shifting in the process of fitting the plane. The success rate of film sticking is not high, which greatly affects the user experience. Therefore, there is an urgent need on the market to provide a film sticking device that can assist users in completing the film sticking operation, in order to accurately and quickly attach the protection films to the screens.

SUMMARY

In order to overcome the shortcomings of the prior art, a film sticking device is provided in the present invention. The film sticking device includes a main body. The main body includes a first film sticking part. The first film sticking part is provided with a first bottom wall and a first side wall. The first bottom wall is connected to the first side wall. A first accommodating slot is surrounded and formed between the first bottom wall and the first side wall. The first accommodating slot is used for receiving an electronic device. A first accommodating opening is defined in the first accommodating slot. The first accommodating opening is in communication with the first accommodating slot. The first bottom wall is provided with a protruding film positioning component. The film positioning component is used for fixing a screen protection film. Through the above structure, the screen protection film can be placed on the first bottom wall, a position of the screen protection film can be fixed through the film positioning component, then the electronic device such as a mobile phone can be placed in the first accommodating slot, a screen of the electronic device such as the mobile phone can be made facing the screen protection film, afterwards a first release film on the screen protection film can be torn off, so that the screen protection film is adhered to the screen of the electronic device such as the mobile phone. Moreover, due to the film positioning component that fixes the position of the screen protection film, the position of the screen protection film can be prevented from shifting, thereby making the screen protection film more accurately adhere to the screen of the electronic device such as the mobile phone.

Beneficial effects of the present invention are as follows. The film sticking device is provided in the present invention, including the main body. The main body includes the first film sticking part. The first film sticking part is provided with the first bottom wall and the first side wall. The first bottom wall is connected to the first side wall. The first accommodating slot is surrounded and formed between the first bottom wall and the first side wall. The first accommodating slot is used for accommodating the electronic device. The first accommodating opening is defined in the first accommodating slot. The first accommodating opening is in communication with the first accommodating slot. The first bottom wall is provided with the protruding film positioning component. The film positioning component is used for fixing the screen protection film. Therefore, a user can place the screen protection film on the first bottom wall, fix the position of the screen protection film through the film positioning component, then place the electronic device such as the mobile phone in the first accommodating slot, make the screen of the electronic device such as the mobile phone face the screen protection film, afterwards tear off the first release film on the screen protection film to make the screen protection film adhere to the screen of the electronic device such as the mobile phone. Moreover, due to the film positioning component that fixes the position of the screen protection film, the position of the screen protection film can be prevented from shifting, thereby making the screen protection film more accurately adhere to the screen of the electronic device such as the mobile phone.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
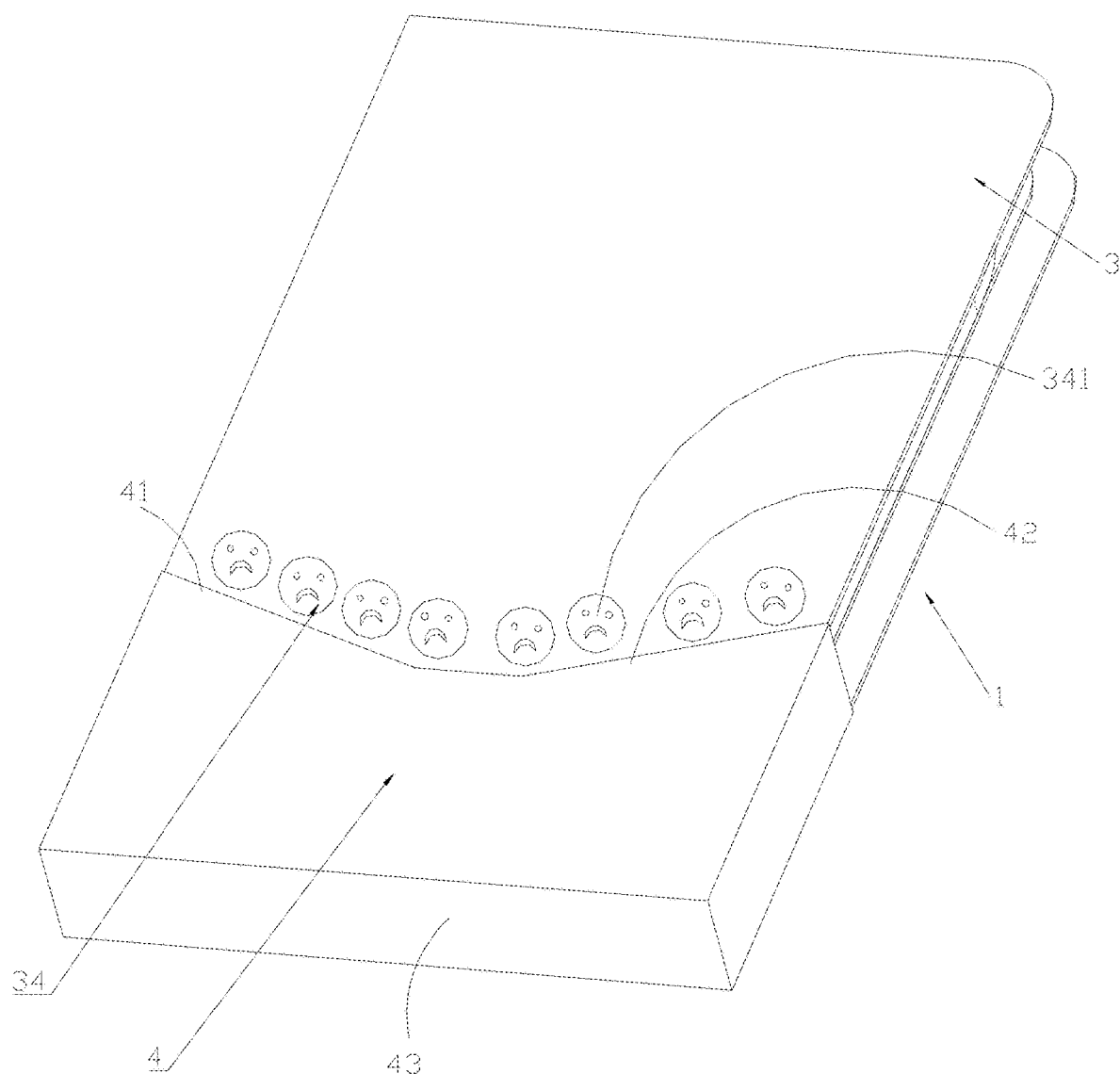
FIG. 1 is a schematic diagram of an overall structure of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
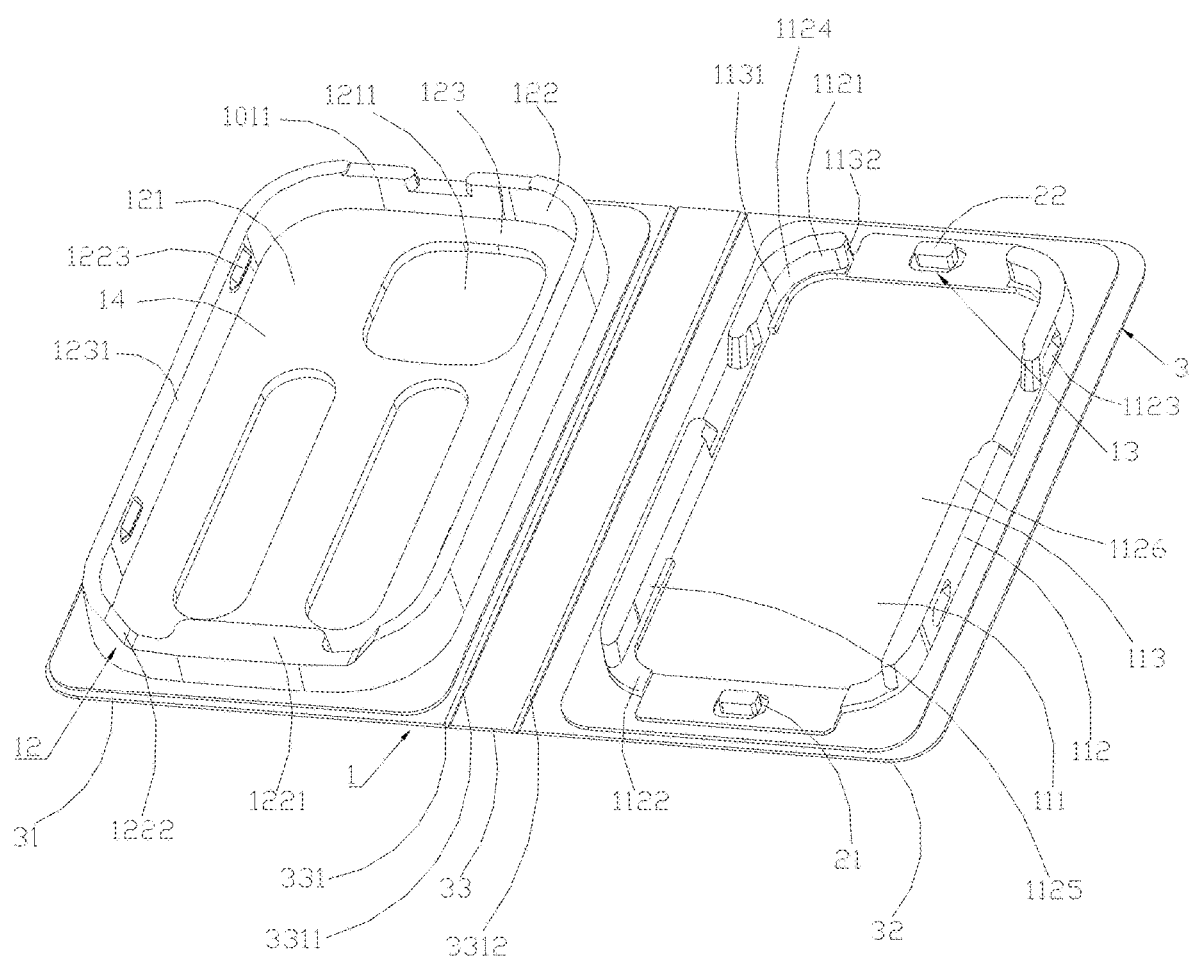
FIG. 2 is another schematic diagram of an overall structure of the present invention.
Figure 3:
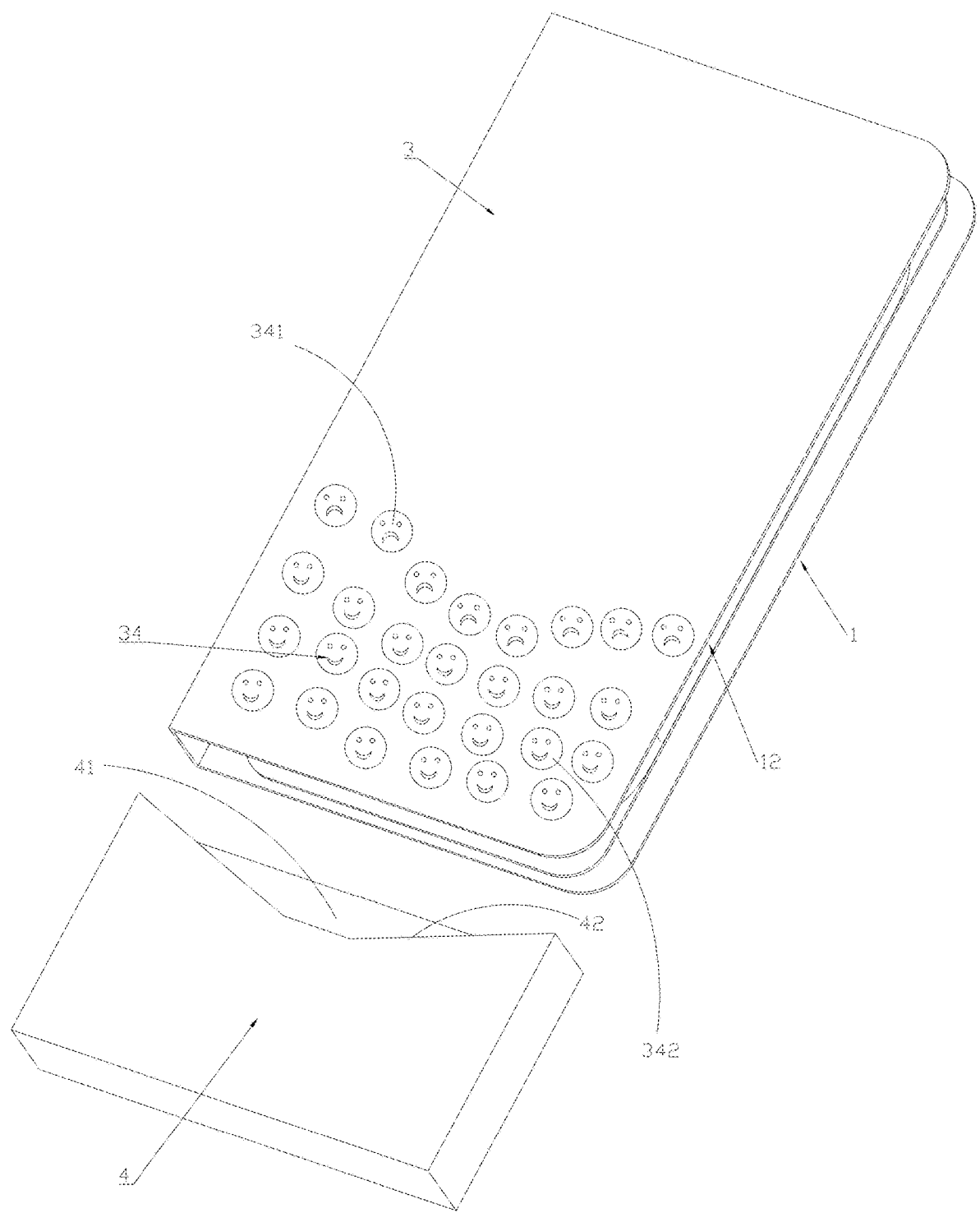
FIG. 3 is an exploded view of the present invention.
Figure 4:
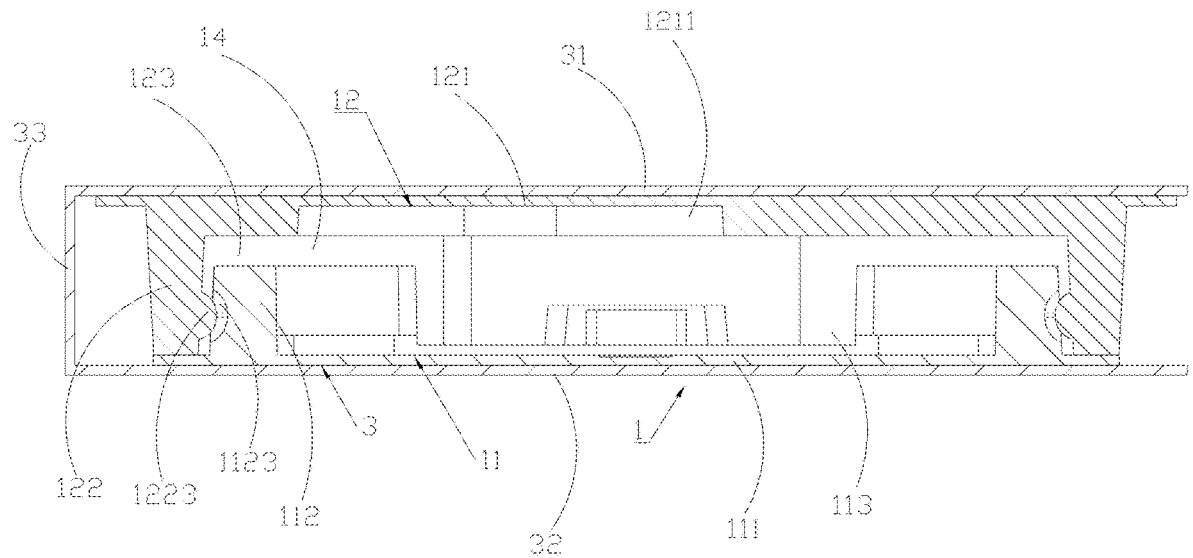
FIG. 4 is a sectional view taken along an engaging buckle and an engaging slot.
Figure 5:
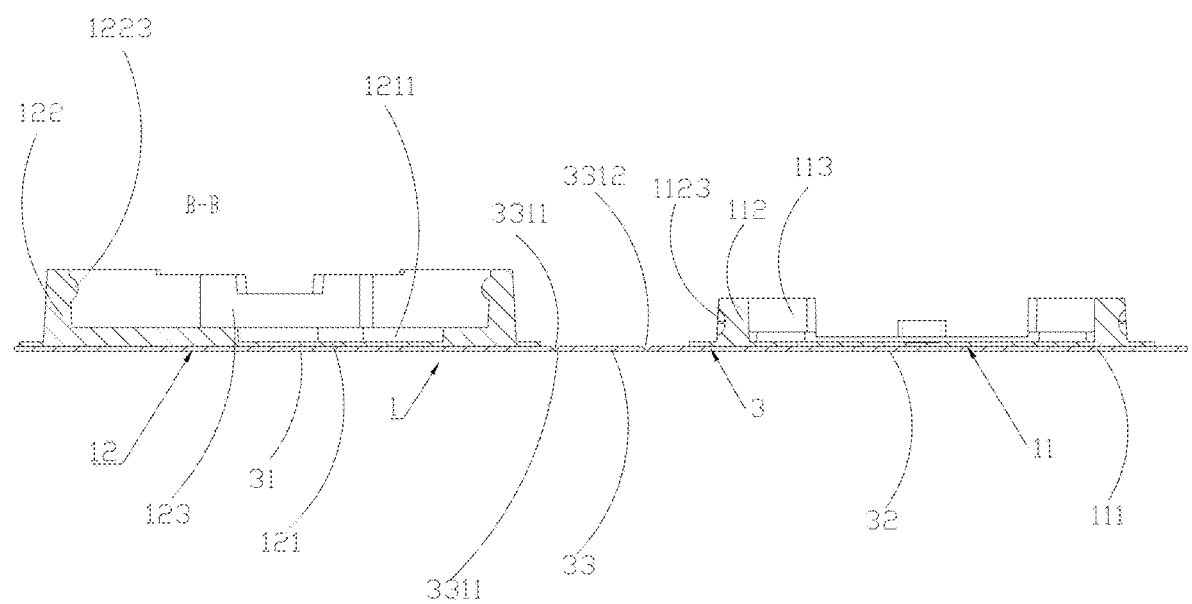
FIG. 5 is another sectional view taken along an engaging buckle and an engaging slot.
Figure 6:
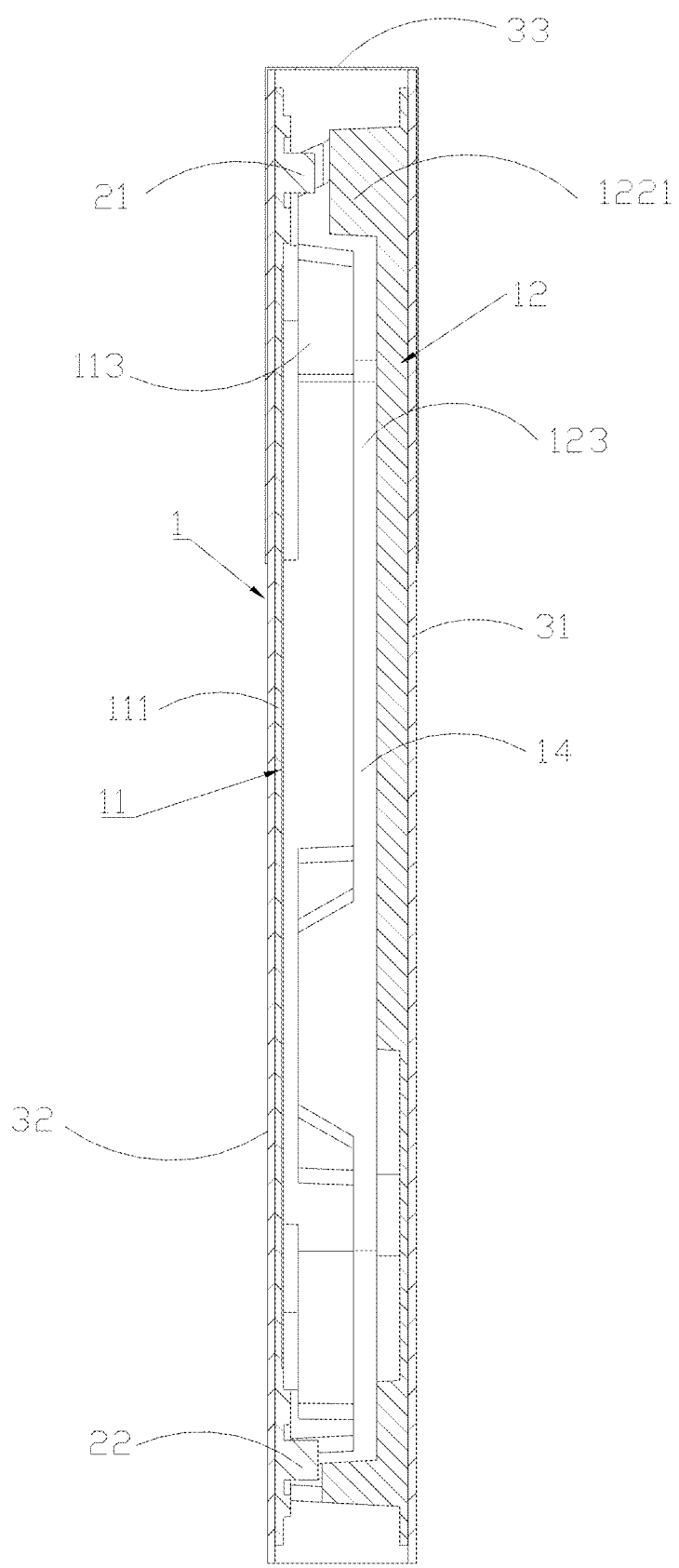
FIG. 6 is a sectional view taken along a film positioning component and an accommodating cavity.
Figure 7:
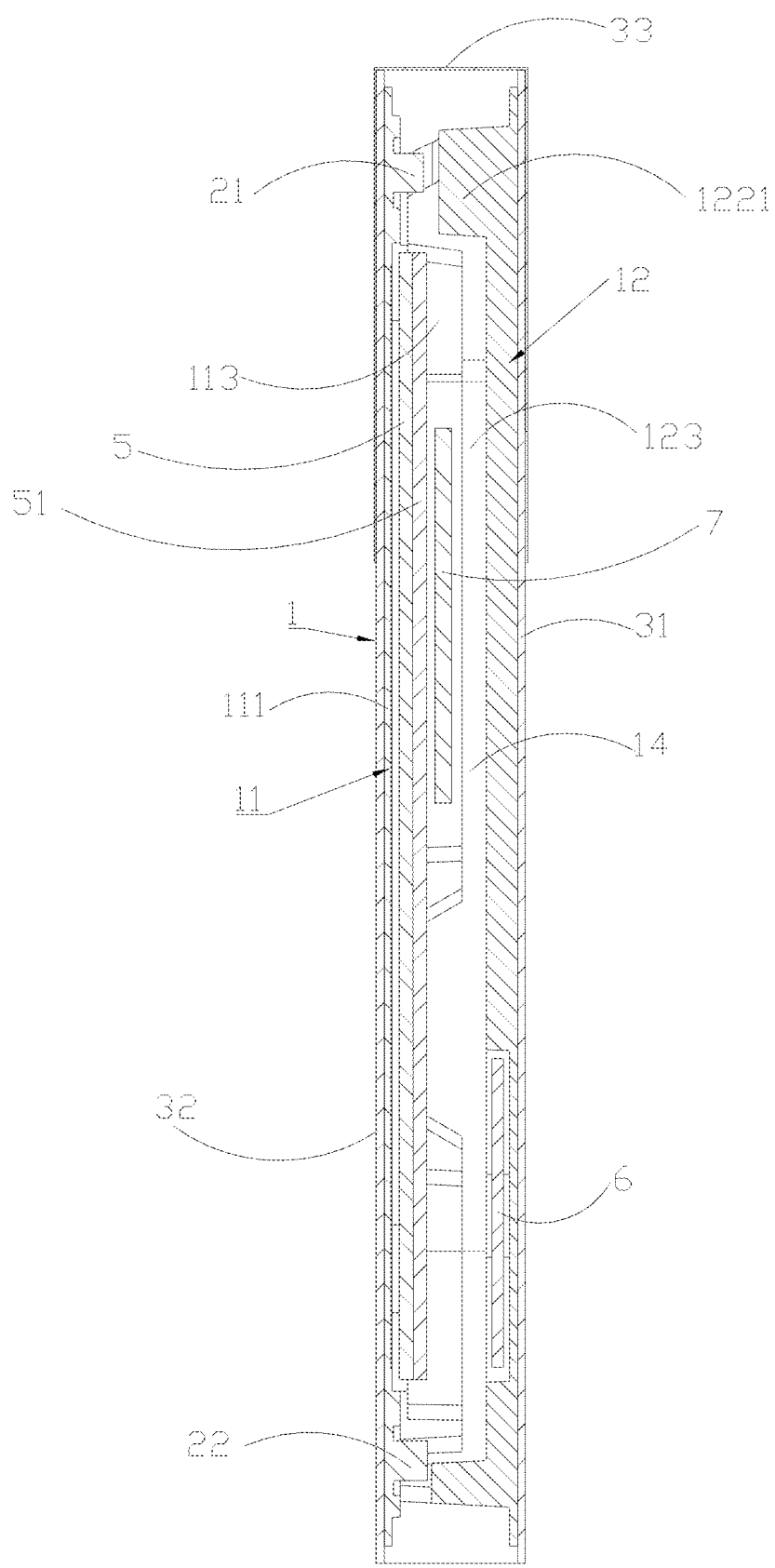
FIG. 7 is another sectional view taken along a film positioning component and an accommodating cavity.
Figure 8:
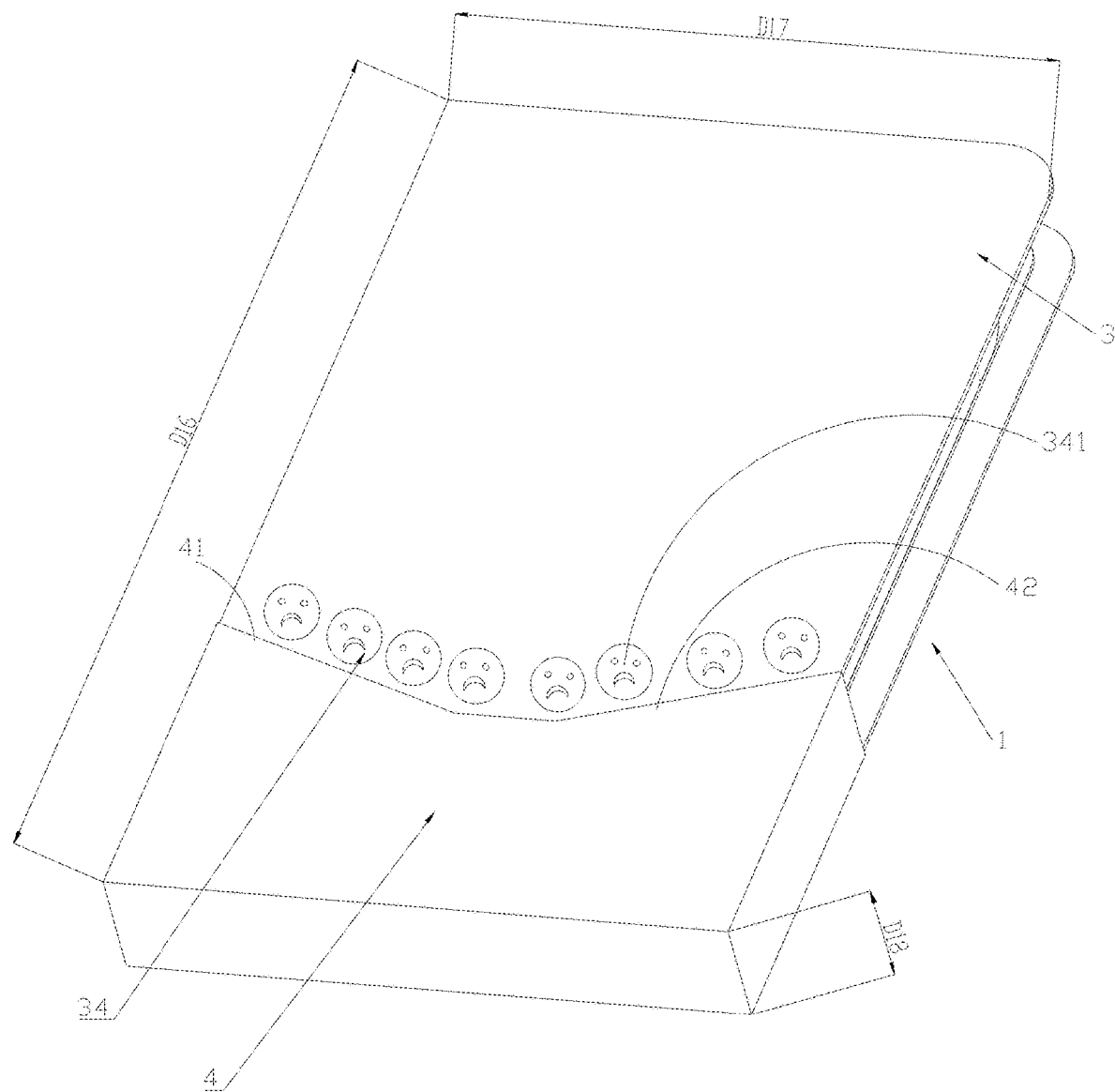
FIG. 8 is another schematic diagram of an overall structure of the present invention.
Figure 9:
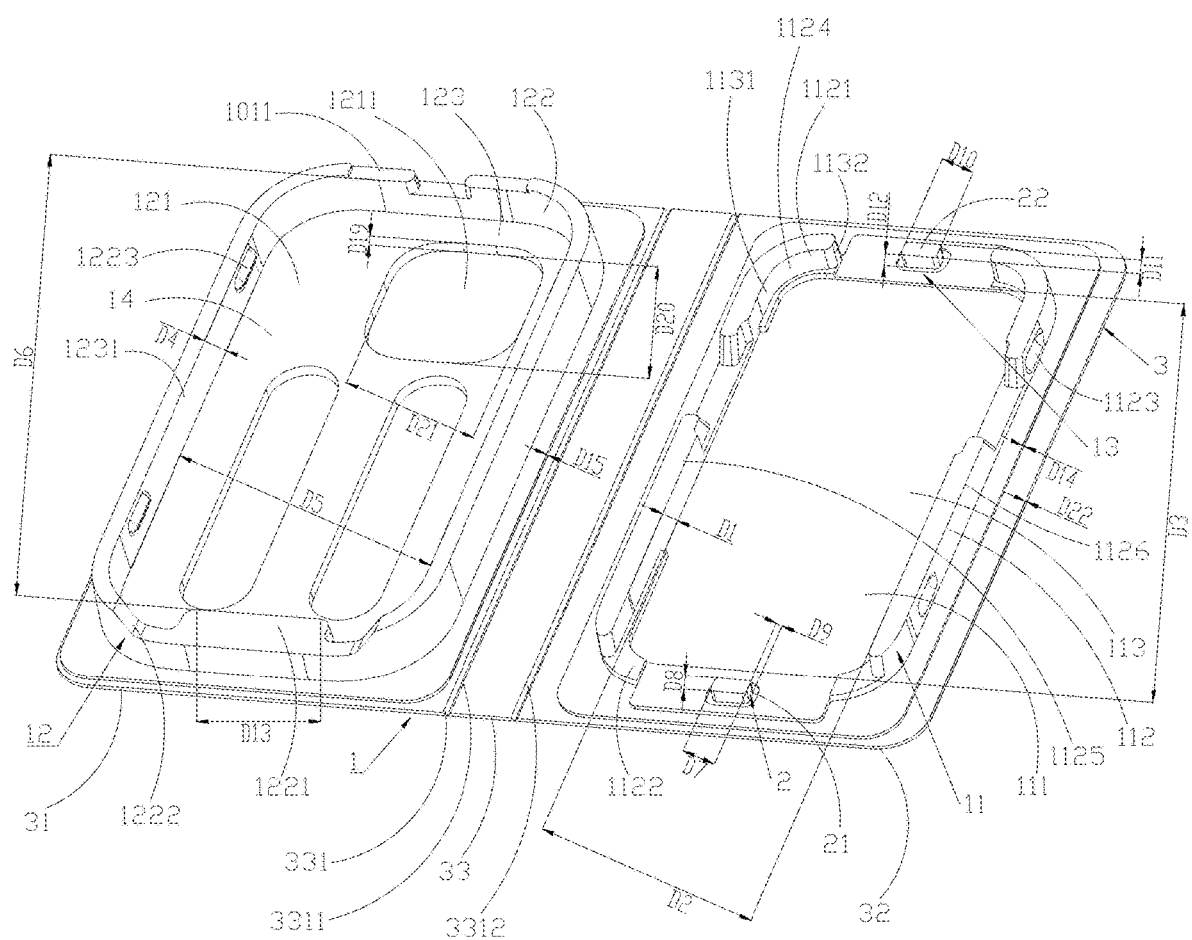
FIG. 9 is another schematic diagram of an overall structure of the present invention.
Figure 10:
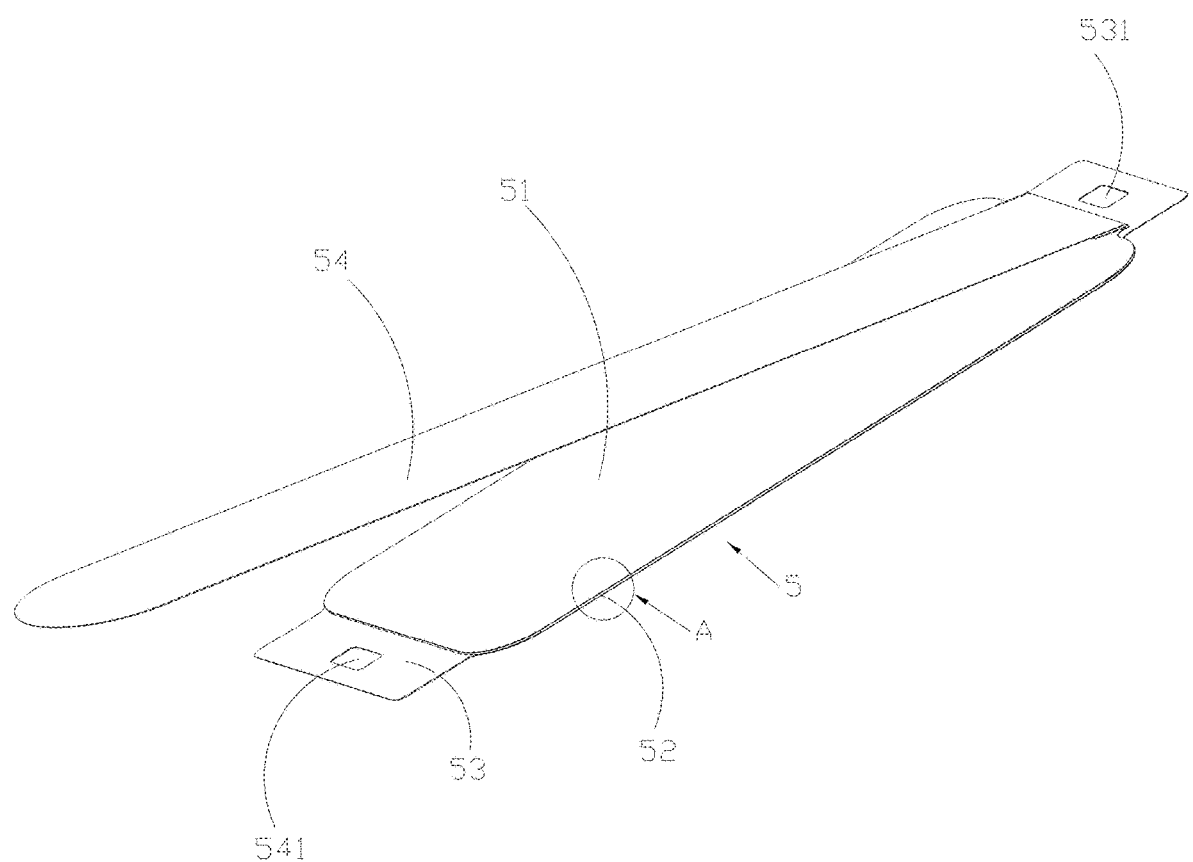
FIG. 10 is a schematic diagram of a structure of a screen protection film.
Figure 11:
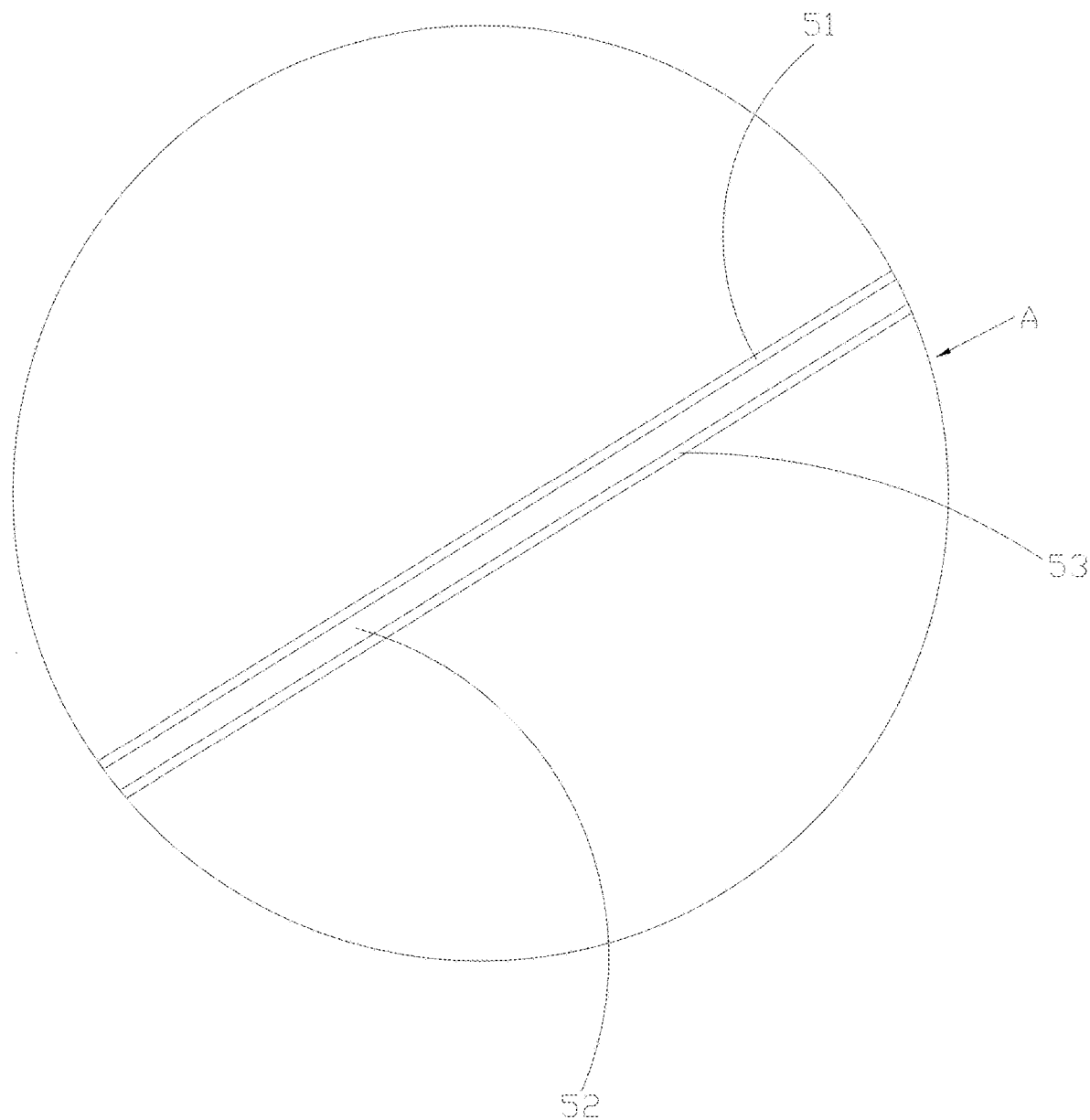
FIG. 11 is an enlarged view of area A in FIG. 10.
Figure 12:
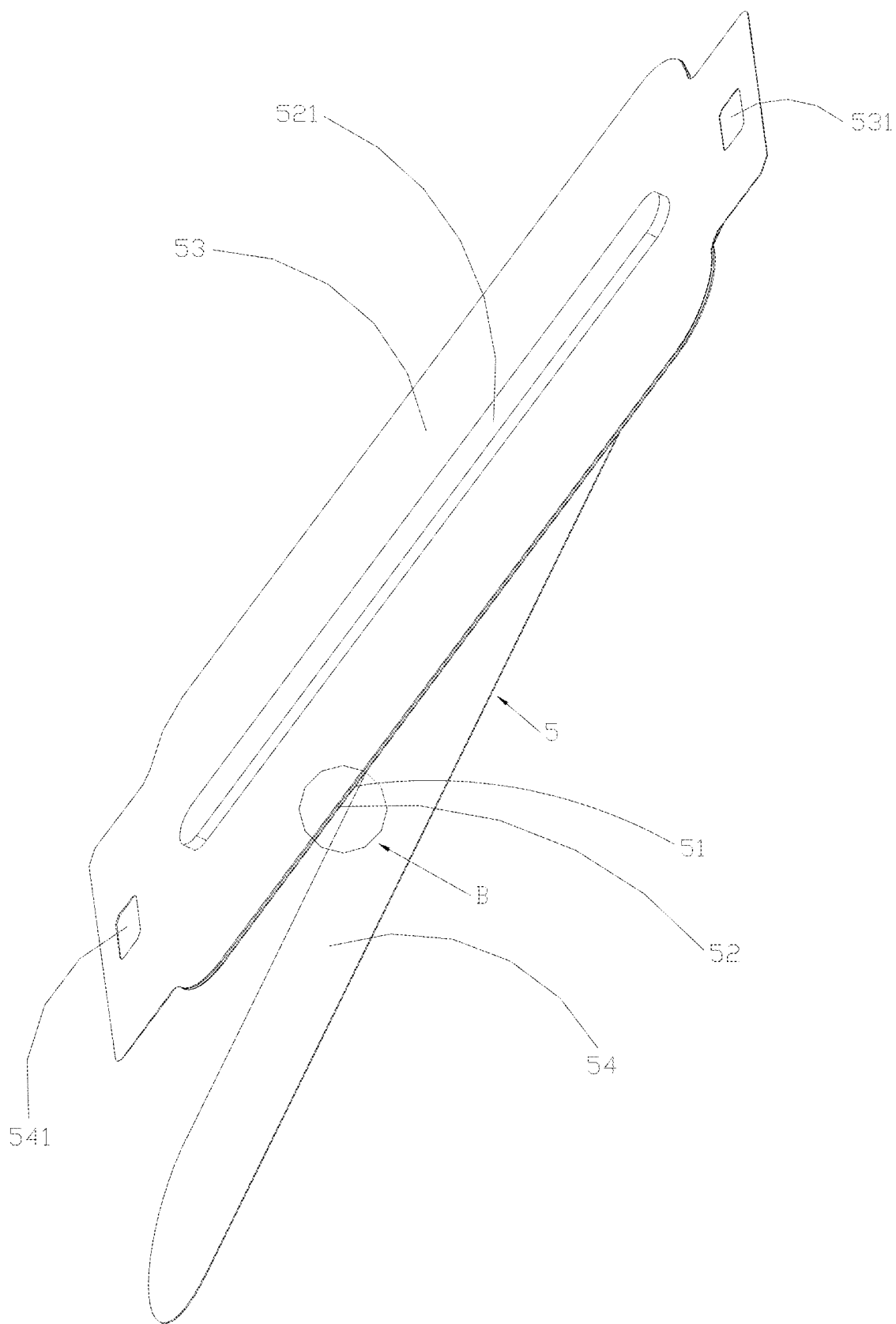
FIG. 12 is another schematic diagram of a structure of a screen protection film.
Figure 13:
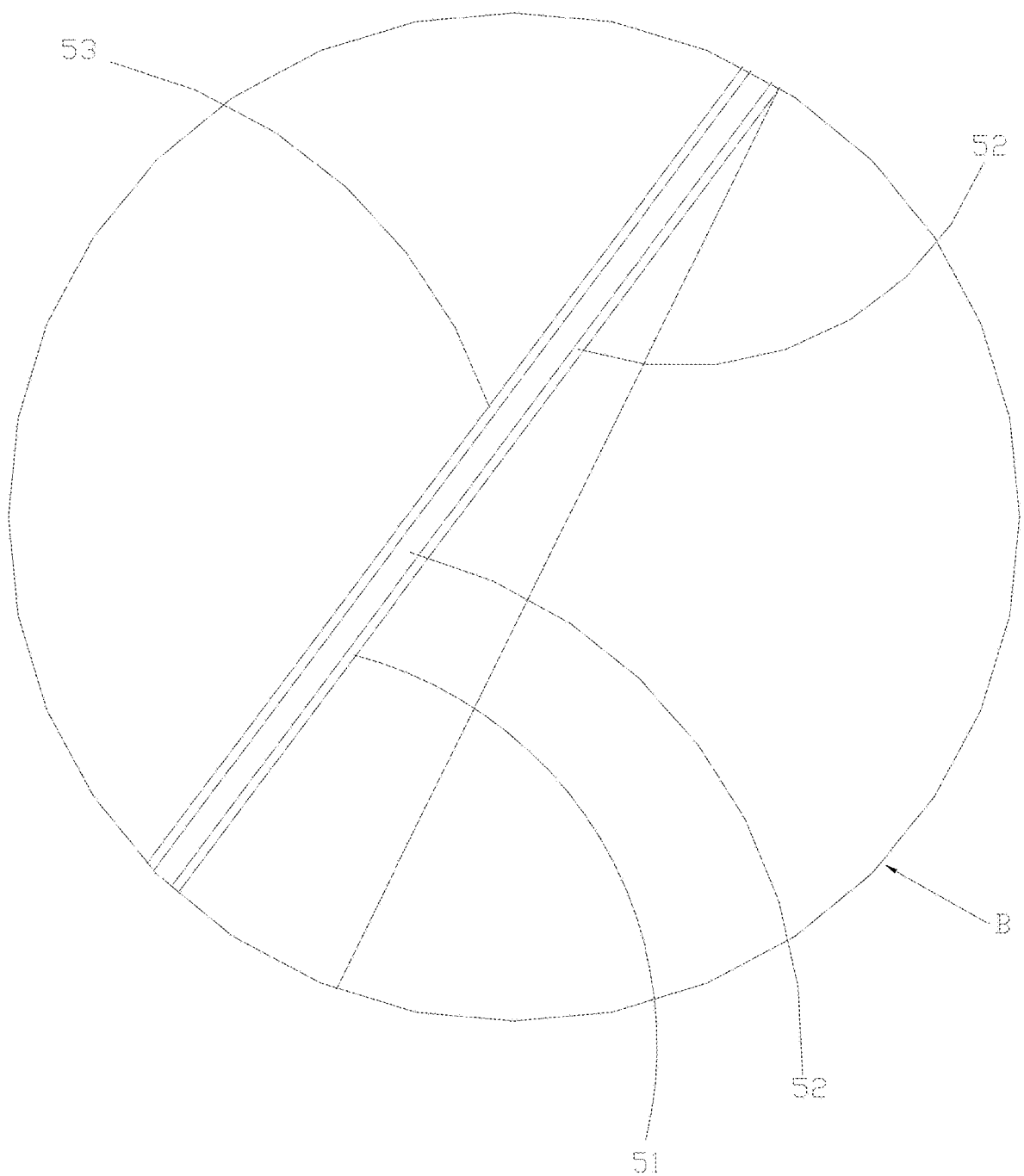
FIG. 13 is an enlarged view of area B in FIG. 12.
Figure 14:
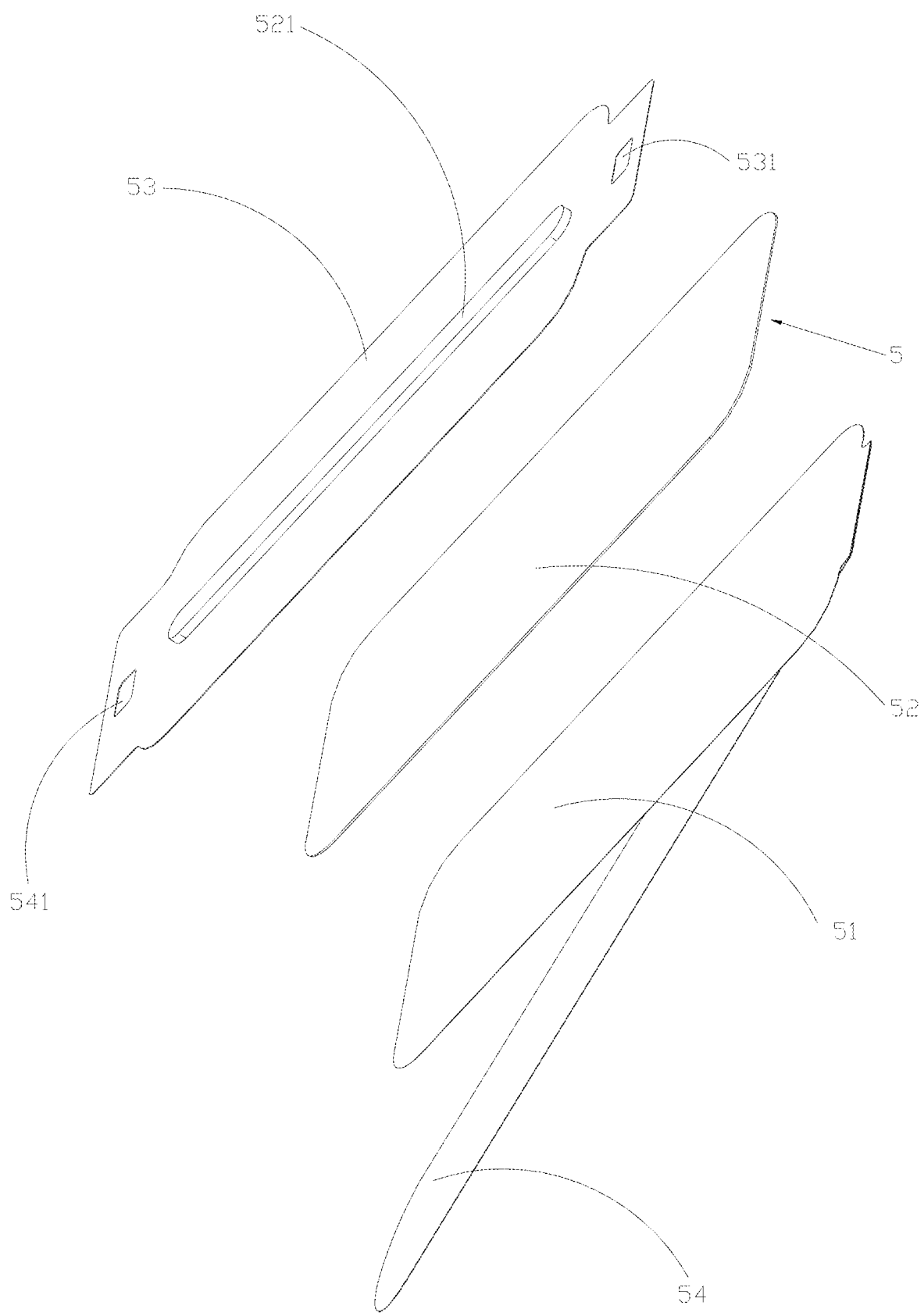
FIG. 14 is an exploded view of a screen protection film.

Referring to FIGS. 1-14, a film sticking device includes a main body 1. The main body 1 includes a first film sticking part 11. The first film sticking part 11 is provided with a first bottom wall 111 and a first side wall 112. The first bottom wall 111 is connected to the first side wall 112. A first accommodating slot 113 is surrounded and formed between the first bottom wall 111 and the first side wall 112. The first accommodating slot 113 is used for receiving an electronic device. A first accommodating opening 1131 is defined in the first accommodating slot 113. The first accommodating opening 1131 is in communication with the first accommodating slot 113. The first bottom wall 111 is provided with a protruding film positioning component 2. The film positioning component 2 is used for fixing a screen protection film 5. Through the above structure, the film sticking device includes the main body 1. The main body 1 includes the first film sticking part 11. The first film sticking part 11 is provided with the first bottom wall 111 and the first side wall 112. The first bottom wall 111 is connected to the first side wall 112. The first accommodating slot 113 is surrounded and formed between the first bottom wall 111 and the first side wall 112. The first accommodating slot 113 is used for receiving the electronic device. The first accommodating opening 1131 is defined in the first accommodating slot 113. The first accommodating opening 1131 is in communication with the first accommodating slot 113. The first bottom wall 111 is provided with the protruding film positioning component 2. The film positioning component 2 is used for fixing the screen protection film 5. Therefore, a user can place the screen protection film 5 on the first bottom wall 111, fix a position of the screen protection film through the film positioning component 2, then place the electronic device such as a mobile phone in the first accommodating slot 113, make a screen of the electronic device such as the mobile phone face the screen protection film 5, afterwards tear off a first release film 51 on the screen protection film 5 to make the screen protection film 5 adhere to the screen of the electronic device such as the mobile phone. Moreover, due to the film positioning component 2 that fixes the position of the screen protection film 5, the position of the screen protection film 5 can be prevented from shifting, thereby making the screen protection film 5 more accurately adhere to the screen of the electronic device such as the mobile phone.

In this embodiment, the main body 1 further includes a second film sticking part 12. The second film sticking part 12 is connected to the first film sticking part 11. The second film sticking part 12 is configured for detachably covering the first accommodating slot 113 and the first accommodating opening 1131. Moreover, a position limiting space 13 is formed between the second film sticking part 12 and the first film sticking part 11. The second film sticking part 12 and the first film sticking part 11 are used for limiting the electronic device within the position limiting space 13. The main body 1 also includes a second film sticking part 12. The second film sticking part 12 is connected to the first film sticking part 11. The second film sticking part 12 is configured for detachably covering the first accommodating slot 113 and the first accommodating opening 1131. The second film sticking part 12 is provided with a first top wall 121 and a second side wall 122. The first top wall 121 is connected to the second side wall 122. The first top wall 121 and the second side wall 122 surround to form a second accommodating slot 123. The second accommodating slot 123 is provided with a second accommodating opening 1231. Specifically, an upper end of the first side wall 112 is provided with a first position limiting block 1121, and a lower end of the first side wall 112 is provided with a first notch 1122 for the first release film 51 of the screen protection film 5 to pass through. Furthermore, a lower end of the second side wall 122 is provided with a second position limiting block 1221. When the second film sticking part 12 is connected to the first film sticking part 11, and the second film sticking part 12 covers the first accommodating slot 113 and the first accommodating opening 1131, a position limiting space 13 is formed between the first position limiting block 1121 and the second position limiting block 1221. Furthermore, the lower end of the second side wall 122 is provided with a second notch 1222 for the first release film 51 of the screen protection film 5 to pass through. Furthermore, the second position limiting block 1221 extends from the lower end of the second side wall 122 into the second accommodating slot 123. Through the above structure, due to the first notch 1122 provided at the lower end of the first side wall 112 for the first release film 51 of the screen protection film 5 to pass through, when the electronic device is placed in the first accommodating slot 113 and oriented towards the screen protection film 5, it is convenient for the user to tear off the first release film 51 on the screen protection film 5 through the first notch 1122, so as to attach the screen protection film 5 to the screen of the electronic device. Furthermore, when the second film sticking part 12 is connected to the first film sticking part 11, and the second film sticking part 12 covers the first accommodating slot 113 and the first accommodating opening 1131, the position limiting space 13 is formed between the first position limiting block 1121 and the second position limiting block 1221, so that the first position limiting block 1121 and the second position limiting block 1221 respectively press against an upper end and a lower end of the electronic device, allowing the first position limiting block 1121 and the second position limiting block 1221 to accurately limit the electronic device within the position limiting space 13, thereby preventing the position of the electronic device from shifting during the film sticking process.

In this embodiment, a width of the second accommodating slot 123 is greater than a width of the first accommodating slot 113. A width of the second accommodating opening 1231 is greater than a width of the first accommodating opening 1131. When the second film sticking part 12 covers the first accommodating slot 113 and the first accommodating opening 1131, the first side wall 112 is placed into the second accommodating slot through the second accommodating opening 1231. An upper end of a side wall of the first accommodating slot 113 is provided with a third notch 1132. The film positioning component 2 includes a first film positioning convex block 21 and a second film positioning convex block 22. When the second film sticking part 12 covers the first accommodating slot 113 and the first accommodating opening 1131, the first film positioning convex block 21 is positioned in the first notch 1122 and the second notch 1222, and the second film positioning convex block 22 is positioned in the third notch 1132. Through the above structure, since the first side wall 112 is placed into the second accommodating slot through the second accommodating opening 1231, the first accommodating slot 113 and the second accommodating slot 123 jointly surround the electronic device, and the second film sticking part 12 is capable of stopping the screen protection film 5 at the first film positioning convex block 21 and the second film positioning convex block 22, thereby preventing the position of the screen protection film 5 from shifting. Specifically, an upper end of the second side wall is also provided with a first stop wall 1011. When the second film sticking part 12 covers the first accommodating slot 113 and the first accommodating opening 1131, the first stop wall is capable of stopping the screen protection film 5 at the first film positioning convex block 21 and the second film positioning convex block 22.

In this embodiment, the film sticking device further includes a connecting part 3. Both the first film sticking part 11 and the second film sticking part 12 are connected to the connecting part 3. The first film sticking part 11 and the second film sticking part 12 are rotatably connected through the connecting part 3. The connecting part 3 includes a left half part 31, a right half part 32, and a middle part 33. The left half part 31 and the right half part 32 are connected through the middle part 33. The first bottom wall 111 of the first film sticking part 11 is connected to an upper surface of the right half part 32. The first top wall 121 of the second film sticking part 12 is connected to an upper surface of the left half part 31. The middle part 33 is provided with a rotating portion 331. The left half part 31 and the right half part 32 are rotatably connected through the rotating portion 331. Specifically, the rotating portion 331 includes a concave first crease 3311. The left half part 31 and the right half part 32 are rotatably connected through the first crease 3311. Furthermore, the rotating portion 331 also includes a concave second crease 3312. The left half part 31 and the right half part 32 are rotatably connected through the first crease 3311 and the second crease 3312. The first crease 3311 and the second crease 3312 are sequentially arranged at intervals along a width direction of the middle part 33. Furthermore, the connecting part 3 is a connecting cardboard, the first film sticking part 11 is a first plastic film sticking part, and the second film sticking part 12 is a second plastic film sticking part. Furthermore, both the first film sticking part 11 and the second film sticking part 12 are connected to the connecting part 3 through gluing or hot melting. Through the above structure, the first film sticking part 11 and the second film sticking part 12 are rotatable relative to each other through the first crease 3311 and the second crease 3312 of the connecting part 3, so that the second film sticking part 12 is capable of rotating to cover the first film sticking part 11. Moreover, since the connecting part 3 is the connecting cardboard, the first film sticking part 11 is the first plastic film sticking part, and the second film sticking part 12 is the second plastic film sticking part, a surface of the first film sticking part 11 and a surface of the second film sticking part 12 are covered through the connecting cardboard, and there is no need to use additional packaging boxes to package the first film sticking part 11 and the second film sticking part 12, which can save additional packaging costs.

In this embodiment, the first top wall 121 of the second film sticking part 12 is provided with a lens groove 1211. The lens groove 1211 is used for placement of a lens protection film 6. Through the above structure, the lens protection film 6 can be placed in the lens groove 1211. When the second film sticking part 12 covers the first accommodating slot 113 and the first accommodating opening 1131, the lens protection film 6 in the lens groove 1211 can be attached to a camera lens of the electronic device, thereby protecting the camera lens of the electronic device, and preventing the camera lens of the electronic device from being damaged due to collision. Moreover, when the second film sticking part 12 covers the first accommodating slot 113 and the first accommodating opening 1131, the screen protection film 5 can be attached to the screen of the electronic device such as the mobile phone, and at the same time, the lens protection film 6 in the lens groove 1211 can be attached to the camera lens of the electronic device, so as to complete the work of sticking a film to the screen and the work of sticking a film to the lens at the same time. A depth of the lens groove is less than a depth of the second accommodating slot. A width of the lens groove is less than a width of the second accommodating slot. A length of the lens groove is less than a length of the second accommodating slot.

In this embodiment, a recessed engaging slot 1123 is defined in an outer surface of the first side wall 112. An inner surface of the second side wall 122 is provided with a protruding engaging buckle 1223. The engaging buckle 1223 is detachably connected to the engaging slot 1123. Through the above structure, due to the detachable connection between the engaging buckle 1223 and the engaging slot 1123, the second film sticking part 12 and the first film sticking part 11 are connected as a whole, so as to quickly and firmly press the lens protection film 6 in the lens groove 1211 to the lens, and quickly and firmly press the screen protection film 5 to the screen.

In this embodiment, when the second film sticking part 12 detachably covers the first accommodating slot 113 and the first accommodating opening 1131, an accommodating cavity 14 is formed between the second film sticking part 12 and the first film sticking part 11. The accommodating cavity 14 is capable of being used for accommodating the screen protection film 5 and/or the lens protection film 6 and/or a dust removing accessory 7. Through the above structure, by placing the screen protection film 5 and/or the lens protection film 6 and/or the dust removing accessory 7 in the accommodating cavity 14, the packaging volume of the film sticking device can be reduced, and it is also convenient for the user to take and place the screen protection film 5 and/or the lens protection film 6 and/or the dust removing accessory 7 to complete the film sticking work. Moreover, during the transportation of the film sticking device, the accommodating cavity 14 is capable of effectively protecting the screen protection film 5 and/or the lens protection film 6 and/or the dust removing accessory 7.

In this embodiment, the film sticking device further includes a connecting part 3. Both the first film sticking part 11 and the second film sticking part 12 are connected to the connecting part 3. The film sticking device further includes a sleeving part 4. A sleeving opening 41 is defined in the sleeving part 4. When the second film sticking part 12 is connected to the first film sticking part 11, and the second film sticking part 12 covers the first accommodating slot 113 and the first accommodating opening 1131, the sleeving opening 41 is sleeved on the first film sticking part 11 and the second film sticking part 12, and an inner wall of the sleeving opening 41 locks the first film sticking part 11 to the second film sticking part 12. A surface area of the connecting part 3 is greater than a sum of surface areas of the first film sticking part 11 and the second film sticking part 12. Through the above structure, the sleeving part 4 locks the first film sticking part 11 to the second film sticking part 12, which can make the film sticking device more organized as a whole, and at the same time prevent separation between the second film sticking part 12 and the first film sticking part 11, thereby preventing the screen protection film 5 and/or the lens protection film 6 and/or the dust removing accessory 7 in the accommodating cavity 14 from being lost during transportation. The accommodating cavity is capable of accommodating at least two screen protection films.

In this embodiment, a surface of the connecting part 3 is provided with a first pattern 34. The sleeving part 4 is configured for covering at least one part of the first pattern 34. At least one part of the first pattern 34 is exposed out of the sleeving part 4. The sleeving part 4 is provided with a window 42. At least one part of the first pattern 34 is exposed through the window 42. Furthermore, the first pattern 34 includes at least a first image unit 341 and a second image unit 342. The first image unit 341 is different from the second image unit 342. Furthermore, an upper end of the sleeving part 4 is provided with a sleeving opening 41. A lower end of the sleeving part 4 is provided with a second stop wall 43. The second stop wall 43 is pressed against an outer edge of the connecting part 3 or an outer edge of the first film sticking part 11 or an outer edge of the second film sticking part 12. Furthermore, the window 42 is a V-shaped window 42, a trapezoidal window 42, an arc-shaped window 42, or a bow-shaped window 42. Through the above structure, since the sleeving part 4 covers at least one part of the first pattern 34, and at least one part of the first pattern 34 is exposed out of the sleeving part 4, making the covered first pattern 34 maintain a sense of mystery. When the user gradually separates the covering part 4 from the first film sticking part and the second film sticking part, the first pattern 34 gradually appears completely to surprise the user. Specifically, the first image unit 341 is a first expression, and the second image unit 342 is a second expression.

In this embodiment, a depth D1 of the first accommodating slot 113 is in a range from 1 mm to 10 mm, a width D2 of the first accommodating slot 113 is in a range from 20 mm to 100 mm, and a length D3 of the first accommodating slot 113 is in a range from 50 mm to 200 mm. A depth D4 of the second accommodating slot 123 is in a range from 1 mm to 10 mm, a width D5 of the second accommodating slot is in a range from 30 mm to 110 mm, and a length D6 of the second accommodating slot is in a range from 60 mm to 210 mm. A length D7 of the first film positioning convex block 21 is in a range from 1 mm to 15 mm, a width D8 of the first film positioning convex block 21 is in a range from 1 mm to 10 mm, and a height D9 of the first film positioning convex block 21 is in a range from 1 mm to 6 mm. A length D10 of the second film positioning convex block 22 is in a range from 1 mm to 15 mm, a width D11 of the second film positioning convex block 22 is in a range from 1 mm to 10 mm, and a height D12 of the second film positioning convex block 22 is in a range from 1 mm to 6 mm. A width D13 of the second position limiting block 1221 is in a range from 1 mm to 80 mm. A thickness D14 of the first bottom wall 111 is in a range from 0.1 mm to 5 mm, and a thickness D15 of the first top wall 121 is in a range from 0.1 mm to 5 mm. When the second film sticking part 12 covers the first film sticking part 11, a length D16 of the main body 1 is in a range from 60 mm to 210 mm, a width D17 of the main body 1 is in a range from 10 mm to 150 mm, and a height D18 of the main body 1 is in a range from 3 mm to 30 mm. A depth D19 of the lens groove 1211 is in a range from 1 mm to 6 mm, a width D20 of the lens groove 1211 is in a range from 5 mm to 60 mm, and a length D21 of the lens groove 1211 is in a range from 5 mm to 60 mm. A thickness D22 of the connecting part 3 is in a range from 0.1 mm to 5 mm.

In this embodiment, the film positioning component 2 includes a first film positioning convex block 21 and a second film positioning convex block 22. The film sticking device further includes a screen protection film 5. The screen protection film is provided with a protection film body 52, a first release film 51, a second release film 53, and a pull strip 54. An upper surface of the second release film is attached to a lower surface of the protection film body. A lower surface of the second release film is used for pressing against a surface of the first bottom wall. A lower surface of the first release film is attached to an upper surface of the protection film body. The pull strip is connected to the first release film. The lower surface of the second release film is provided with a flexible first pressing convex block 521. A first film positioning opening 531 is defined in an upper end of the second release film. A second film positioning opening 541 is defined in a lower end of the second release film. The first film positioning opening is connected to the first film positioning convex block. The second film positioning opening is connected to the second film positioning convex block. Through the above structure, the user can pull the pull strip, so that the pull strip drives the first release film to be separated from the protection film body, and the first release film is disengaged through the first notch, allowing the upper surface of the protection film body to be attached to the screen of the electronic device. Moreover, since the first film positioning opening is connected to the first film positioning convex block, and the second film positioning opening is connected to the second film positioning convex block, the position of the protection film can be accurately fixed. Furthermore, since the lower surface of the second release film is provided with the first pressing convex block 521, and the first pressing convex block 521 abuts against the first bottom wall, the first bottom wall better presses the protection film onto the screen of the electronic device, thereby reducing bubbles between the protection film and the screen. Furthermore, after the protection film body is attached to a surface of the electronic screen, the second release film can be separated from the lower surface of the protection film body, so that the user can use the screen by directly touching the lower surface of the protection film body.

In this embodiment, the first side wall includes an upper side wall 1124, a left side wall 1125, and a right side wall 1126. An upper end of the left side wall is connected to an upper end of the right side wall. The first notch is positioned between a lower end of the left side wall and a lower end of the right side wall. The first position limiting block is provided on the upper side wall. The left side wall is a flat left side wall, the right side wall is a flat right side wall, and the first bottom wall is a flat first bottom wall. Through the above structure, the first notch is positioned between the lower end of the left side wall and the lower end of the right side wall, the first position limiting block is provided on the upper side wall, the left side wall is a flat left side wall, the right side wall is a flat right side wall, and the first bottom wall is a flat first bottom wall, so that the first release film can be prevented from being squeezed during the process of detaching from the protection film body, and the first release film is prevented from being curled, allowing the first release film to detach from the protection film body more smoothly, thereby preventing the protection film body from being pulled during the process of tearing off the first release film, so as to accurately attach the protection film body to the screen of the electronic device.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A film sticking device, comprising a main body, a connecting part and a sleeving part, wherein the main body comprises a first film sticking part; the first film sticking part is provided with a first bottom wall and a first side wall; the first bottom wall is connected to the first side wall; a first accommodating slot is surrounded and formed between the first bottom wall and the first side wall; the first accommodating slot is used for receiving an electronic device; a first accommodating opening is defined in the first accommodating slot; the first accommodating opening is in communication with the first accommodating slot; the first bottom wall is provided with a protruding film positioning component; and the film positioning component is used for fixing the screen protection film,
    wherein the main body further comprises a second film sticking part; the second film sticking part is connected to the first film sticking part; the second film sticking part is configured for detachably covering the first accommodating slot and the first accommodating opening; a position limiting space is formed between the second film sticking part and the first film sticking part; and the second film sticking part and the first film sticking part are used for limiting the electronic device within the position limiting space,
    wherein both the first film sticking part and the second film sticking part are connected to the connecting part; a sleeving opening is defined in the sleeving part; when the second film sticking part is connected to the first film sticking part, and the second film sticking part covers the first accommodating slot and the first accommodating opening, the sleeving opening is sleeved on the first film sticking part and the second film sticking part, and an inner wall of the sleeving opening locks the first film sticking part to the second film sticking part.

2. The film sticking device according to claim 1, wherein the main body also comprises a second film sticking part; the second film sticking part is connected to the first film sticking part; the second film sticking part is configured for detachably covering the first accommodating slot and the first accommodating opening; the second film sticking part is provided with a first top wall and a second side wall; the first top wall is connected to the second side wall; the first top wall and the second side wall surround to form a second accommodating slot; and the second accommodating slot is provided with a second accommodating opening.

3. The film sticking device according to claim 2, wherein an upper end of the first side wall is provided with a first position limiting block; and a lower end of the first side wall is provided with a first notch for a first release film of a screen protection film to pass through.

4. The film sticking device according to claim 3, wherein a lower end of the second side wall is provided with a second position limiting block; when the second film sticking part is connected to the first film sticking part, and the second film sticking part covers the first accommodating slot and the first accommodating opening, a position limiting space is formed between the first position limiting block and the second position limiting block.

5. The film sticking device according to claim 3, wherein a lower end of the second side wall is provided with a second notch for the first release film of the screen protection film to pass through.

6. The film sticking device according to claim 4, wherein the second position limiting block extends from the lower end of the second side wall into the second accommodating slot.

7. The film sticking device according to claim 2, wherein a width of the second accommodating slot is greater than a width of the first accommodating slot; a width of the second accommodating opening is greater than a width of the first accommodating opening; and when the second film sticking part covers the first accommodating slot and the first accommodating opening, the first side wall is placed into the second accommodating slot through the second accommodating opening.

8. The film sticking device according to claim 5, wherein an upper end of a side wall of the first accommodating slot is provided with a third notch; the film positioning component comprises a first film positioning convex block and a second film positioning convex block; when the second film sticking part covers the first accommodating slot and the first accommodating opening, the first film positioning convex block is positioned in the first notch and the second notch, and the second film positioning convex block is positioned in the third notch; an upper end of the second side wall is also provided with a first stop wall; and when the second film sticking part covers the first accommodating slot and the first accommodating opening, the first stop wall is used for stopping the screen protection film at the first film positioning convex block and the second film positioning convex block.

9. The film sticking device according to claim 2, further comprising a connecting part, wherein both the first film sticking part and the second film sticking part are connected to the connecting part; the first film sticking part and the second film sticking part are rotatably connected through the connecting part; the connecting part comprises a left half part, a right half part, and a middle part; the left half part and the right half part are connected through the middle part; the first bottom wall of the first film sticking part is connected to an upper surface of the right half part; the first top wall of the second film sticking part is connected to an upper surface of the left half part; the middle part is provided with a rotating portion; and the left half part and the right half part are rotatably connected through the rotating portion.

10. The film sticking device according to claim 9, wherein the rotating portion comprises a concave first crease; the left half part and the right half part are rotatably connected through the first crease; the rotating portion also comprises a concave second crease; the left half part and the right half part are rotatably connected through the first crease and the second crease; and the first crease and the second crease are sequentially arranged at intervals along a width direction of the middle part.

11. The film sticking device according to claim 9, wherein the connecting part is a connecting cardboard; the first film sticking part is a first plastic film sticking part; and the second film sticking part is a second plastic film sticking part.

12. The film sticking device according to claim 1, wherein the film positioning component comprises a first film positioning convex block and a second film positioning convex block; the film sticking device further comprises a screen protection film; the screen protection film is provided with a protection film body, a first release film, a second release film, and a pull strip; an upper surface of the second release film is attached to a lower surface of the protection film body; a lower surface of the second release film is used for pressing against a surface of the first bottom wall; a lower surface of the first release film is attached to an upper surface of the protection film body; the pull strip is connected to the first release film; the lower surface of the second release film is provided with a flexible first pressing convex block; a first film positioning opening is defined in an upper end of the second release film; a second film positioning opening is defined in a lower end of the second release film; the first film positioning opening is connected to the first film positioning convex block; and the second film positioning opening is connected to the second film positioning convex block.

13. The film sticking device according to claim 9, wherein both the first film sticking part and the second film sticking part are connected to the connecting part through gluing or hot melting.

14. The film sticking device according to claim 2, wherein the first top wall of the second film sticking part is provided with a lens groove; the lens groove is used for placement of a lens protection film; a recessed engaging slot is defined in an outer surface of the first side wall; an inner surface of the second side wall is provided with a protruding engaging buckle; and the engaging buckle is detachably connected to the engaging slot.

15. The film sticking device according to claim 1, wherein when the second film sticking part detachably covers the first accommodating slot and the first accommodating opening, an accommodating cavity is formed between the second film sticking part and the first film sticking part; and the accommodating cavity is capable of being used for accommodating a screen protection film and/or a lens protection film and/or a dust removing accessory.

16. The film sticking device according to claim 1, wherein a surface of the connecting part is provided with a first pattern; the sleeving part is configured for covering at least one part of the first pattern; at least one part of the first pattern is exposed out of the sleeving part; the sleeving part is provided with a window; and at least one part of the first pattern is exposed through the window.

17. The film sticking device according to claim 3, wherein the first side wall comprises an upper side wall, a left side wall, and a right side wall; an upper end of the left side wall is connected to an upper end of the right side wall; the first notch is positioned between a lower end of the left side wall and a lower end of the right side wall; the first position limiting block is provided on the upper side wall; the left side wall is a flat left side wall; the right side wall is a flat right side wall; and the first bottom wall is a flat first bottom wall.

18. A film sticking device, comprising a main body, wherein the main body comprises a first film sticking part; the first film sticking part is provided with a first bottom wall and a first side wall; the first bottom wall is connected to the first side wall; a first accommodating slot is surrounded and formed between the first bottom wall and the first side wall; the first accommodating slot is used for receiving an electronic device; a first accommodating opening is defined in the first accommodating slot; the first accommodating opening is in communication with the first accommodating slot; the first bottom wall is provided with a protruding film positioning component; and the film positioning component is used for fixing the screen protection film;

wherein the main body further comprises a second film sticking part; the second film sticking part is connected to the first film sticking part; the second film sticking part is configured for detachably covering the first accommodating slot and the first accommodating opening; the second film sticking part is provided with a first top wall and a second side wall; the first top wall is connected to the second side wall; the first top wall and the second side wall surround to form a second accommodating slot; and the second accommodating slot is provided with a second accommodating opening;

wherein an upper end of the first side wall is provided with a first position limiting block; and a lower end of the first side wall is provided with a first notch for a first release film of a screen protection film to pass through;

wherein a lower end of the second side wall is provided with a second notch for the first release film of the screen protection film to pass through;

wherein an upper end of a side wall of the first accommodating slot is provided with a third notch; the film positioning component comprises a first film positioning convex block and a second film positioning convex block; when the second film sticking part covers the first accommodating slot and the first accommodating opening, the first film positioning convex block is positioned in the first notch and the second notch, and the second film positioning convex block is positioned in the third notch; an upper end of the second side wall is also provided with a first stop wall; and when the second film sticking part covers the first accommodating slot and the first accommodating opening, the first stop wall is used for stopping the screen protection film at the first film positioning convex block and the second film positioning convex block;

wherein a depth of the first accommodating slot is in a range from 1 mm to 10 mm, a width of the first accommodating slot is in a range from 20 mm to 100 mm, and a length of the first accommodating slot is in a range from 50 mm to 200 mm.

19. A film sticking device, comprising a main body, wherein the main body comprises a first film sticking part; the first film sticking part is provided with a first bottom wall and a first side wall; the first bottom wall is connected to the first side wall; a first accommodating slot is surrounded and formed between the first bottom wall and the first side wall; the first accommodating slot is used for receiving an electronic device; a first accommodating opening is defined in the first accommodating slot; the first accommodating opening is in communication with the first accommodating slot; the first bottom wall is provided with a protruding film positioning component; and the film positioning component is used for fixing the screen protection film;

wherein the main body also comprises a second film sticking part; the second film sticking part is connected to the first film sticking part; the second film sticking part is configured for detachably covering the first accommodating slot and the first accommodating opening; the second film sticking part is provided with a first top wall and a second side wall; the first top wall is connected to the second side wall; the first top wall and the second side wall surround to form a second accommodating slot; and the second accommodating slot is provided with a second accommodating opening;

wherein an upper end of the first side wall is provided with a first position limiting block; and a lower end of the first side wall is provided with a first notch for a first release film of a screen protection film to pass through;

wherein a lower end of the second side wall is provided with a second notch for the first release film of the screen protection film to pass through;

wherein an upper end of a side wall of the first accommodating slot is provided with a third notch; the film positioning component comprises a first film positioning convex block and a second film positioning convex block; when the second film sticking part covers the first accommodating slot and the first accommodating opening, the first film positioning convex block is positioned in the first notch and the second notch, and the second film positioning convex block is positioned in the third notch; an upper end of the second side wall is also provided with a first stop wall; and when the second film sticking part covers the first accommodating slot and the first accommodating opening, the first stop wall is used for stopping the screen protection film at the first film positioning convex block and the second film positioning convex block;

wherein a depth of the second accommodating slot is in a range from 1 mm to 10 mm, a width of the second accommodating slot is in a range from 30 mm to 110 mm, and a length of the second accommodating slot is in a range from 60 mm to 210 mm; a length of the first film positioning convex block is in a range from 1 mm to 15 mm, a width of the first film positioning convex block is in a range from 1 mm to 10 mm, and a height of the first film positioning convex block is in a range from 1 mm to 6 mm; a length of the second film positioning convex block is in a range from 1 mm to 15 mm, a width of the second film positioning convex block is in a range from 1 mm to 10 mm, and a height of the second film positioning convex block is 1 mm-6 mm; a width of the second position limiting block is in a range from 1 mm to 80 mm; a thickness of the first top wall is in a range from 0.1 mm to 5 mm; when the second film sticking part covers the first film sticking part, a length of the main body is in a range from 60 mm to 210 mm, a width of the main body is in a range from 10 mm to 150 mm, and a height of the main body is in a range from 3 mm to 30 mm.

* * * * *